United States Patent Office 3,365,517
Patented Jan. 23, 1968

3,365,517
MIXTURES OF POLYCARBONATES AND
POLYARYLENE POLYETHERS
Bruce P. Barth, Somerville, N.J., assignor to Union
Carbide Corporation, a corporation of New York
No Drawing. Filed Apr. 8, 1965, Ser. No. 446,737
8 Claims. (Cl. 260—860)

This invention relates to thermoplastic polymeric compositions and more particularly relates to mixtures of polycarbonates and polyarylene polyethers characterized by improved resistance to thermal stress embrittlement, increased heat distortion temperatures and improved resistance to environmental stress cracking and crazing.

Aromatic carbonate polymers are well known, commercially available thermoplastic polymeric materials having a variety of applications in the plastics art. Such carbonate polymers may be prepared by reacting a dihydric phenol, such as 2,2-bis-(4-hydroxyphenyl)propane, with a carbonate precursor such as phosgene, in the presence of an acid binding agent. Generally speaking, aromatic polycarbonate resins offer a high resistance to the attack of mineral acids, may be easily molded, and are physiologically harmless as well as stain resistant. In addition, such polymers have high tensile and impact strengths. However, in certain applications the use of aromatic polycarbonate resins is limited since they exhibit severe environmental stress crazing and cracking. By "environmental stress crazing and cracking" is meant the type of failure which is hastened by the presence of organic solvents such as, for example, acetone, heptane or carbon tetrachloride when such solvents are in contact with stressed parts fabricated from aromatic polycarbonate resins. Such contact may occur, for instance, when the solvents are used to clean, degrease or lubricate stressed parts fabricated from polycarbonate polymers.

The environmental stress crazing and cracking characteristics of polycarbonate resins have been termed their most serious deficiency, and a variety of methods have been proposed in an effort to reduce the propensity of stressed polycarbonate parts to craze and crack while in contact with organic solvents such as those mentioned above. However, such methods have never been entirely satisfactory since they generally have an adverse effect upon the desirable properties of polycarbonate resins. Consequently, a means for reducing the environmental stress crazing and cracking of polycarbonate resins without appreciably affecting any of the desirable properties has heretofore not been available.

Generally speaking, thermoplastic polyarylene polyethers of the class described herein are characterized by excellent tensile, flexural and compressive strengths, good impact strength, excellent electrical properties, and excellent resistance to attack by both acids and bases. More importantly, these polymers offer excellent thermal properties far surpassing those of any melt fabricable thermoplastic material. However, in certain applications it has been observed that these thermoplastic polyarylene polyether polymers undergo thermal stress embrittlement. By this is meant that a stressed part fabricated from these polymers will undergo cracking and crazing when exposed to elevated temperatures. For example, load bearing (stressed) automotive parts fabricated from these polymers will generally craze and/or crack when exposed to heat generated by the motor.

Unexpectedly, it has now been discovered that polycarbonate polymers are rendered more resistant to environmental stress crazing and cracking and that their heat distortion temperatures are increased, and that thermoplastic polyarylene polyethers are rendered more resistant to thermal stress embrittlement by admixing an aromatic polycarbonate polymer and a thermoplastic polyarylene polyether described below.

Thermoplastic polyarylene polyethers used in the present invention are linear thermoplastic polymers having a basic structure composed of recurring units having the formula —O—E—O—E'— wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residua E and E' are characterized in this manner since they are conveniently prepared by the reaction of an alkali metal double salt of a dihydric phenol and a dihalobenzenoid compound having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenyl)propane, 1,1-bis-(4 - hydroxyphenyl)-2-phenylethane, bis-(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, ether oxygen (—O—), carbonyl (—CO—), sulfide (—S—), sulfone (—SO₂—), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

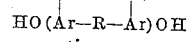

wherein Ar is a aromatic group and preferably is a phenylene group, Y and $Y_1$ can be the same or different inert substituent groups as alkyl groups having from 1 to 4 carbon atoms, halogen atoms, i.e. fluorine, chlorine, bromine, oriodine, or alkoxy radicals having from 1 to 4 carbon atoms, r, and z are integers having a value of from 0 to 4, inclusive, and R is representative of a bond between aromatic carbon atoms as in dihydroxydiphenyl, or is a divalent radical, including for example, inorganic radicals as —CO—, —O—, —S—, —S—S—, —SO₂—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane,
2,4'-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane, 1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3-hexafluoropropane
and the like.

Di(hydroxyphenyl)sulfones such as
bis-(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone, and the like.

Di(hydroxyphenyl)ethers such as
bis-(4-hydroxyphenyl)ether,
the 4,3'-, 4,2'-2,2'-, 2,3'-dihydroxydiphenyl ethers,
4,4'-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis(4-hydroxynaphthyl)ether,
bis-(4-hydroxy-3-chloronaphthyl)ether,
4,4'-dihydroxy-3,6-dimethoxydiphenyl ether,
4,4'-dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group (—SO₂—) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev. 49, 273 (1951) and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:

(a) monovalent groups that activate one or more halogens on the same ring as a nitro group, phenylsulfone, or alkylsulfone, cyano, trifluoromethyl, nitroso, and hetero nitrogen as in pyridine.

(b) divalent groups which can activate displacement of halogens on two different rings, such as the sulfone group —SO₂—; the carbonyl group —CO—; the vinyl group —CH=CH—; the sulfoxide group —SO—; the azo-group —N=N—; the saturated fluorocarbon groups —CF₂—CF₂—; organic phosphine oxides

where R is a hydrocarbon group, and the ethylidene group

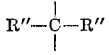

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

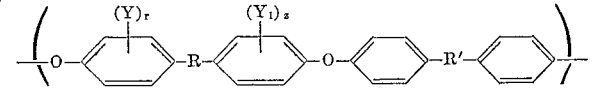

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and Y₁ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive. Even more preferred are the thermoplastic polyarylene polyethers of the above formula wherein r and z are zero, R is divalent connecting radical $$R''-\underset{|}{\overset{|}{C}}-R''$$

wherein R" represents a member of the group consisting of hydrogen, lower alkyl, lower aryl, and the halogen substituted groups thereof, and R' is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

The specific solvents employed have the formula $$R-S(O)_z-R$$

wherein each R represents a monovalent lower hydrocarbon group free of aliphatic unsaturation on the alpha carbon atom, and preferably contains less than about 8 carbon atoms or when connected together represents a divalent alkylene group with z being an integer from 1 to 2 inclusive. In all of these solvents, all oxygens and two carbon atoms are bonded directly to the sulfur atom. Specifically mentionable of these solvents are dimethylsulfoxide, dimethylsulfone, diethylsulfoxide, diethylsulfone, diisopropylsulfone, tetrahydrothiophene 1,1-dioxide (commonly called tetramethylene sulfone or sulfolane), tetrahydrothiophene-1 monoxide, and the like.

Thermoplastic polyarylene polyethers described herein can also be prepared in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

In the polymerization reactions described herein substantially anhydrous conditions are maintained before and during the reaction. While amounts of water up to about one percent can be tolerated amounts of water substantially greater than this are desirably avoided. In order to secure high molecular weight polymers, the system should be substantially anhydrous, and preferably with less than 0.5 percent by weight water in the reaction mixtures.

In the two-step process described above, where the alkali metal salt of the dihydric phenol is prepared in situ in the reaction solvent, the dihydric phenol and an alkali metal hydroxide are admixed in essentially stoichiometric amounts and normal precautions taken to remove all the water of neutralization preferably by distillation of a water-containing azeotrope from the solvent-metal salt mixture. Benzene, xylene, halogenated benzenes or other inert organic azeotrope-performing organic liquids are suitable for this purpose.

The azeotrope former can be one either miscible or immiscible with the sulfone or sulfoxide major solvent. If it is not miscible it should be one which will not cause precipitation of the polymer in the reaction mass. Heptane is such a solvent. It is preferred to employ azeotrope formers which are miscible with the major solvents and which also act as cosolvents for the polymer during polymerization. Chlorobenzene, dichlorobenzene and xylene are azeotrope formers of this class. Preferably the azeotrope former should be one boiling below the decomposition temperature of the major solvent and be perfectly stable and inert in the process, particularly inert to the alkali metal hydroxide when the alkali metal salt of the dihydric phenol is prepared in situ in the presence of the inert diluent or azeotrope former. It has been found that chlorobenzene and o-dichlorobenzene serve particularly well as the inert diluent and are able to significantly reduce the amount of the sulfone or sulfoxide solvent necessary. The cosolvent mixture using even as much as 50 percent of the halogenated benzene with dimethylsulfoxide, for example, not only permits the formed polymer to remain in solution and thus produce high molecular weight polymers, but also provides a very economical processing system, and an effective dehydration operation.

The reaction between the dihalobenzenoid compound and the alkali metal salt of the bisphenol proceeds on an equimolar basis. This can be slightly varied but as little a variation of 5 percent away from equal molar amounts seriously reduces the molecular weight of the polymers.

The reaction of the dihalobenzenoid compound with the alkali metal salt of the dihydric phenol readily proceeds without need of an added catalyst upon the application of heat to such a mixture in the selected sulfone or sulfoxide solvent.

Also desirable is the exclusion of oxygen from the reaction mass to avoid any possibility of oxidative attack to the polymer or to the principal solvent during polymerization.

Reaction temperatures above room temperature and generally above 100° C. are preferred. More preferred are temperatures between about 120° C. to 160° C. Higher temperatures can of course be employed, if desired, provided that care is taken to prevent degradation or decomposition of the reactants, the polymer and the solvents employed. Also temperatures higher than 100° C. are preferred in order to keep the polymer in solution during the reaction since these sulfoxide and sulfone solvents are not particularly good solvents for the polymer except in the hot condition.

The polymer is recovered from the reaction mass in any convenient manner, such as by precipitation induced by cooling the reaction mass or by adding a nonsolvent for the polymer, or the solid polymer can be recovered by stripping off the solvent at reduced pressures or elevated temperatures.

Since the polymerization reaction results in the formation of the alkali metal halide on each coupling reaction, it is preferred to either filter the salts from the polymer solution or to wash the polymer to substantially free it from these salts.

Thermoplastic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

The aromatic carbonate polymers used in the present invention may be prepared by reacting a dihydric phenol with a carbonate precursor such as phosgene, a haloformate, or a carbonate ester. Generally speaking, such carbonate polymers can be typified recurring structural units of the formula

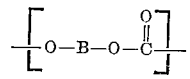

where B is a divalent aromatic radical of the dihydric phenol employed in the polymer producing reaction. The dihydric phenols which may be employed to provide such aromatic carbonate polymers are mononuclear or polynuclear aromatic compounds, containing as functional groups, 2 hydroxy radicals, each of which is attached directly to a carbon atom of an aromatic nucleus.

Typical dihydric phenols are 2,2-bis-(4-hydroxyphenyl)propane,
hydroquinone,
resorcinol,
2,2-bis-(4-hydroxyphenyl)pentane,
2,4-dihydroxy diphenyl methane,
bis-(2-hydroxyphenyl)methane,
bis-(4-hydroxyphenyl)methane,
bis-(4-hydroxy-5-nitrophenyl)methane,
1,1-bis-(4-hydroxyphenyl)ethane,
3,3-bis-(4-hydroxyphenyl)pentane,
2,2'-dihydroxydiphenyl,
2,6-dihydroxy naphthalane,
bis-(4-hydroxyphenyl)sulfone,
2,4'-dihydroxydiphenyl sulfone,
5'-chloro-2,4'-dihydroxydiphenyl sulfone,
bis-(4-hydroxyphenyl)diphenyl disulfone,
4,4'-dihydroxydiphenyl ether,
4,4'-dihydroxy-3,3'-dichlorodiphenyl ether, and
4,4'-dihydroxy-2,5-diethoxydiphenyl ether.

A variety of additional dihydrophenols which may be employed to provide such carbonate polymers are disclosed in U.S. Patent 2,999,835. It is, of course, possible to employ two or more different dihydric phenols, or a dihydric phenol in combination with a glycol, a hydroxy terminated polyester, or a dibasic acid in the event a carbonate copolymer rather than a homopolymer is desired for use in the preparation of the mixtures of the invention.

When a carbonate ester is used as the carbonate precursor in the polymer forming reaction, the materials are reacted at temperatures of from 100° C. or higher for times varying from 1 to 15 hours. Under such conditions ester interchange occurs between the carbonate ester and the dihydric phenol used. The ester interchange is advantageously consummated at reduced pressures of the order of from about 10 to about 100 mm. of mercury, preferably in an inert atmosphere, such as nitrogen or argon, for example.

Although the polymer forming reaction may be conducted in the absence of a catalyst, one may, if desired employ the usual ester exchange catalysts, such as, for example, metallic lithium, potassium, calcium and magnesium. Additional catalysts and variations in the exchange methods are discussed in Groggins, Unit Processes in Organic Synthesis (4th edition, McGraw-Hill Book Company, 1952), pages 616 to 620. The amount of such catalyst, if used, is usually small, ranging from about 0.001 to about 0.1%, based on the moles of the dihydric phenol employed.

The carbonate ester useful in this connection may be aliphatic or aromatic in nature, although aromatic esters, such as diphenyl carbonate, are preferred. Additional examples of carbonate esters which may be used are dimethyl carbonate, diethyl carbonate, phenyl methyl carbonate, phenyltolyl carbonate and di(tolyl) carbonate.

A preferred method for preparing the carbonate polymers suitable for use in the mixtures of this invention involves the use of a carbonyl halide, such as phosgene, as the carbonate precursor. This method involves passing phosgene gas into a reaction mixture containing the dihydric phenol and an acid acceptor such as a tertiary amine (e.g., pyridine, dimethylanaline, quinoline, etc.). The acid acceptor may be used undiluted or diluted with inert organic solvents as, for example, methylene chloride, chlorobenzene, or 1,2 - dichloroethane. Tertiary amines are advantageous since they are good solvents as well as acid acceptors during the reaction.

The temperature at which the carbonyl halide reaction proceeds may vary from below 0° C. to about 100° C. The reaction proceeds satisfactorily at temperatures from room temperature (25° C.) to 50° C. Since the reaction is exothermic, the rate of phosgene addition may be used to control the temperature of the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

Another method for preparing the carbonate polymer comprises adding phosgene to an alkaline aqueous suspension of the dihydric phenol used. This is preferably done in the presence of inert solvents such as methylene chloride, 1,2-dichloroethane and the like.

Quaternary ammonium compounds may be employed to catalyze the reaction.

A third method for preparing such carbonate polymers involves the phosgenation of an agitated suspension of the anhydrous alkali salts of the dihydric phenol used in a non-aqueous medium such as benzene, chlorobenzene, and toluene. The reaction is illustrated by the addition of phosgene to a slurry of the sodium salt of 2,2-bis-(4-hydroxyphenyl)propane in an inert polymer solvent such as chlorobenzene. The organic solvent should preferably be a polymer solvent but need not necessarily be a good solvent for the reactants.

Generally speaking a haloformate such as the bis-haloformate of 2,2-bis-(4-hydroxyphenyl)propane may be substituted for phosgene as the carbonate precursor in any of the methods described above.

In each of the above solution methods of preparation, the carbonate polymer emerges from the reaction in either a true or pseudo solution whether aqueous base or pyridine is used as an acid acceptor. The polymer may be precipitated from the solution by adding a polymer non-solvent, such as heptane or isopropanol. Alternatively, the polymer solution may be heated to evaporate the solvent.

A preferred method for preparing the polycarbonate resins useful in the practice of this invention comprises passing a carbonyl halide, such as phosgene, into a slurry comprising a suspension of solid particles in a single liquid phase, the suspension of solid particles comprising a dihydric phenol and at least two moles, per mole of dihydric phenol, of at least one acid acceptor selected from the group consisting of a hydroxide, a carbonate and a phosphate of an alkali or an alkaline earth metal, and the single liquid phase comprising an inert organic liquid which is a solvent for the carbonate polymer, but a non-solvent for the dihydric phenol and the acid acceptor, to form a reaction mixture having a solid phase and a single liquid phase comprising a solution of the carbonate polymer in the inert organic liquid, and separating the liquid phase from the solid phase.

The proportions of the polymeric constituents employed in the practice of this invention can be varied widely. Generally, from about 1 to about 99 parts by weight of an aromatic polycarbonate polymer are admixed with from about 1 to about 99 parts by weight of a thermoplastic polyarylene polyether. Preferably, from about 15 to about 85 parts by weight of a polycarbonate are admixed with from about 15 to about 85 parts by weight of a polyarylene polyether.

Admixing the polymeric constituents can be accomplished in any manner so long as a thorough blending of polyarylene polyether and polycarbonate resin is obtained. For example, admixing may be accomplished by a variety of methods normally employed for incorporation of plasticizers or fillers into thermoplastic polymers including but not limited to mixing rolls, doughmixers, Banbury mixers, extruders, and other mixing equipment. The resulting polymeric mixtures may be handled in any conventional manner employed for the fabrication or manipulation of thermoplastic resins. The mixtures can be molded using compression, injection, calendering and extrusion techniques. Alternatively, the admixing of polycarbonate and polyarylene polyether may be accomplished by mixing solutions of the two polymers which may thereafter be treated with a non-solvent to effect coprecipitation. The precipitated mixture may then be recovered in a dry state after filtration to remove the non-solvent and final evaporation of residual solvent. Dry blending of a mixture of the individual polymers followed by thermal fusion is a convenient means for producing a conventional molding compound. In this procedure the dry blend may be extruded and chopped into pellets for subsequent use in injection molding procedures. It should be understood that the polycarbonate polyarylene polyether mixtures of this invention may contain other additives to lubricate, prevent oxidation or lend color to the material. Such additives are well known in the art, and may be incorporated without departing from the scope of the invention.

In addition to exhibiting an increased resistance to environmental stress crazing and cracking, the improved polycarbonate polyarylene polyether mixtures of this invention exhibit a relatively high impact strength and an increased softening temperature as compared with unmodified polycarbonate materials. Moreover, the alkaline resistance of polycarbonates by virtue of the incorporation of polyarylene polyethers is greatly improved.

The fact that the addition of a polyarylene polyether to a polycarbonate resin system provides a polymeric mixture having an improved resistance to environmental stress crazing and cracking is totally unexpected and is not fully understood. For example, the polyarylene polyethers are themselves subject to crazing and cracking while under stress and in contact with organic solvents such as those mentioned above, and accordingly would not be expected to improve the environmental stress craze and crack resistance of other thermoplastic materials. In addition, the improvement realized in the heat distortion temperature of a polycarbonate resin by the addition of a polyarylene polyether polymer is greater than would be expected. For example, the addition of 50 parts by weight of polyarylene polyether having a heat distortion temperature of 175° C. to 50 parts by weight of a polycarbonate having a heat distortion temperature of 150° C. would be expected to provide a mixture having a heat distortion temperature of about 163° C. However, such a mixture has heat distortion temperature of about 185° C., or 22° higher than that predicted.

Also the fact that the addition of a polycarbonate to a polyarylene polyether system provides a polymeric mixture having improved resistance to thermal stress embrittlement is totally unexpected and is not fully understood. It is known, for example, that polycarbonates are themselves subject to thermal stress embrittlement, and accordingly would not be expected to improve the thermal stress embrittlement of other thermoplastic materials. The following examples are intended to further illustrate the present invention without limiting the same in any manner. All parts and percentages are by weight unless indicated otherwise.

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced viscosity} = \frac{t_s - t_o}{c \cdot t_o}$$

wherein:

$t_o$ is the efflux time of the pure solvent
$t_s$ is the efflux time of the polymer solution
$c$ is the concentration of the polymer solution expressed in terms of grams of polymer per 100 ml. of solution.

EXAMPLE 1

*Preparation of thermoplastic polyarylene polyether*

In a 250 ml. flask equipped with a stirrer, thermometer, a water cooled condenser and a Dean Stark moisture trap filled with benzene, there were placed 11.42 grams of 2,2-bis - (4 - hydroxyphenyl)propane (0.05 mole), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as an azeotrope with benzene and distilling off enough of the latter to give a refluxing mixture of 130–135° C., consisting of the dipotassium salt of the 2,2 - bis - (4-hydroxyphenyl) propane and dimethylsulfoxide essentially free of water. The mixture was cooled and 14.35 grams (0.05 mole) of 4,4′-dichlorodiphenylsulfone was added followed by 40 ml. of anhydrous dimethylsulfoxide, all under nitrogen pressure. The mixture was heated to 130° C. and held at 130–140° C. with good stirring for 4–5 hours. The viscous, orange solution was poured into 300 ml. water, rapidly circulating in a Waring Blendor, and the finely divided white polymer was filtered and then dried in a vacuum oven at 110° C. for 16 hours. The yield was 22.2 g. (100%) and the reaction was 99% complete based on a titration for residual base.

The polymer had the basic structure

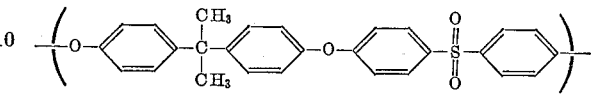

EXAMPLE 2

*Preparation of aromatic polycarbonate polymer*

A slurry is prepared by stirring the following materials in a reaction vessel: 114 parts 2,2-bis-(4-hydroxyphenyl) propane, 129.6 parts calcium hydroxide, and 760 parts methylene chloride.

The slurry is heated to about 40° C. at which time heating is discontinued. Phosgene is added to the stirred slurry at a rate of about 0.82 part per minute for about 55 minutes and thereafter at 0.08 part per minute for an additional 90 minutes. The heat generated by the reaction maintains the slurry at a temperature of 38–40° C., i.e., the reflux temperature of the methylene chloride. After the reaction subsides, air is blown through the reaction mixture to cool it and free it of any excess phosgene. The cool slurry is diluted with methylene chloride, centrifuged, and the solid phase removed. The single liquid phase, consisting of a solution of the carbonate polymer in the methylene chloride, is filtered, and the carbonate polymer precipitated by adding heptane to the solution. The polymer is separated from the mixture by filtration and drying at 125° C. The intrinsic viscosity (ASTM D–1601–61) measured in dioxane at 30° C. of the polymer is 0.54, which corresponds to a molecular weight of about 35,000 (weight average).

EXAMPLES 3–6

*Mixtures of polycarbonates and polyarylene polyethers*

These examples demonstrate the improvement in thermal stress embrittlement gained by incorporating relatively small amounts of polycarbonate into a polyarylene polyether. In these examples polyarylene polyether pellets prepared as in Example 1 and having a RV of 0.52 were dried over night at 130–140° C. in a vacuum oven under 28″ Hg. About 150 grams of the dried pellets were fluxed on an oil-heated, two-roll mill with a roll temperature of 540–570° F. Various amounts of polycarbonate prepared as in Example 2 were then added and mixed in the mill. The admixture was compression molded into 15–30 mil sheets at 480–580° F. Micro-tensile dog-bone test samples were die cut from the sheets and grommets inserted in each end. The samples were then stressed for 30 minutes at 125° C. under a 2000 p.s.i. load. The tensile properties of the stressed bars were determined using an Instron Tester according to the procedures of ASTM D638. Data and results are summarized in the table below. In the table, an improvement in thermal stress embrittlement is indicated by an increase in elongation after yield.

| Example No. | Parts of polycarbonate | Parts of polyarylene polyether | Tensile strength p.s.i. At yield | Tensile strength p.s.i. At failure | Percent elongation after yield |
|---|---|---|---|---|---|
| Control I | | 100 | | 8,500 | *B |
| 3 | 1 | 99 | 10,200 | 8,200 | 5 |
| 4 | 1 | 99 | 10,200 | 8,200 | 32 |
| 5 | 10 | 90 | 10,700 | 6,900 | 5 |
| 6 | 10 | 90 | 10,700 | 6,900 | 11 |
| Control II | 100 | | | 9,500 | B |

*B=Brittle failure, no yield.

EXAMPLE 7

Thermoplastic polyarylene polyether having the formula

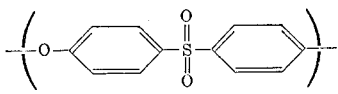

is prepared from 4,4'-dihydroxydiphenyl sulfone and 4,4'-dichlorodiphenyl sulfone according to the procedure of Example 1. A mixture containing 98 parts of this polymer and 2 parts of polycarbonate prepared as in Example 2 is prepared and is injection molded into tensile bars and tested as in Examples 3–6. The mixture exhibits an improvement in thermal stress embrittlement as compared to the control.

EXAMPLE 8

Thermoplastic polyarylene polyether having the formula

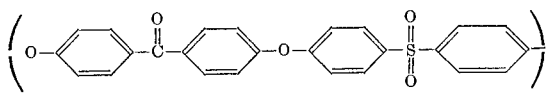

is prepared from the bisphenol of benzophenone and 4,4'-dichlorodiphenyl sulfone according to the procedure of Example 1. A mixture containing 95 parts of this polymer and 5 parts of polycarbonate prepared as in Example 2 is prepared and is injection molded into tensile bars and tested as in Examples 3–6. The mixture exhibits an improvement in thermal stress embrittlement as compared to the control.

EXAMPLE 9

Thermoplastic polyarylene polyether having the formula

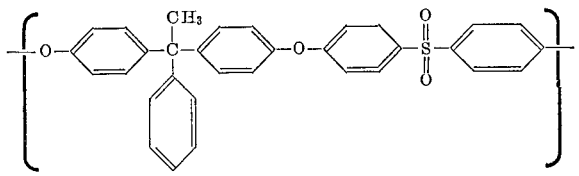

is prepared from the bisphenol of acetophenone and 4,4'-dichlorodiphenyl sulfone according to the procedure of Example 1. A mixture containing 85 parts of this polymer and 15 parts of polycarbonate prepared as in Example 2 is prepared and is injection molded into tensile bars and tested as in Examples 3–6. The mixture exhibits an improvement in thermal stress embrittlement as compared to the control.

EXAMPLE 10

Thermoplastic polyarylene polyether having the formula

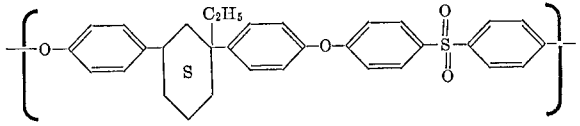

is prepared from the bisphenol of vinyl cyclohexene (prepared by an acid catalyzed condensation of 2 moles of phenol with one mole of vinyl cyclohexene) and 4,4'-dichlorodiphenyl sulfone according to the procedure of Example 1. A mixture containing 80 parts of this polymer and 20 parts of polycarbonate prepared as in Example 2 is prepared and is injection molded into tensile bars and tested as in Examples 3–6. The mixture exhibits an improvement in thermal stress embrittlement as compared to the control.

EXAMPLE 11

Thermoplastic polyarylene polyether having the formula

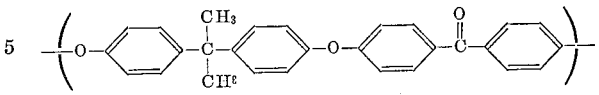

is prepared from 2,2'-bis-(4-hydroxyphenyl)propane and 4,4'-difluorobenzophenone according to the procedure of Example 1. A mixture containing 90 parts of this polymer and 10 parts of polycarbonate prepared as in Example 2 is prepared and is injection molded into tensile bars and tested as in Examples 3–6. The mixture exhibits an improvement in thermal stress embrittlement as compared to the control.

EXAMPLE 12

Thermoplastic polyarylene polyether having the formula

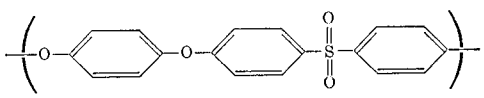

is prepared from hydroquinone and 4,4'-dichlorodiphenylsulfone according to the procedure of Example 1. A mixture containing 97 parts of this polymer and 3 parts of polycarbonate prepared as in Example 2 is prepared and is injection molded into tensile bars and tested as in Examples 3–6. The mixture exhibits an improvement in thermal stress embrittlement as compared to the control.

EXAMPLE 13

Thermoplastic polyarylene polyether having the formula

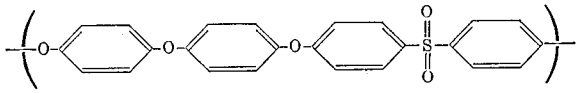

is prepared from 4,4'-dihydroxydiphenyl ether and 4,4'-dichlorodiphenyl sulfone according to the procedure of Example 1. A mixture containing 85 parts of this polymer and 15 parts of polycarbonate prepared as in Example 2 is prepared and is injection molded into tensile bars and tested as in Examples 3–6. The mixture exhibits an improvement in thermal stress embrittlement as compared to the control.

EXAMPLE 14

Thirty-three parts of polyarylene polyether prepared in Example 1 and 67 parts by weight of polycarbonate prepared in Example 2 is placed in a mixing vessel and sufficient chloroform is added to provide a 20 percent solution of the two polymers in the chloroform solvent. The resulting solution is cast into a film having a thickness of 4–5 mils after drying to effect solvent removal. The film thus obtained is transparent, flexible and tough. This film is cut into strips and examined for solvent stress cracking by creasing the film followed by immersion in acetone and by creasing the film after immersion in acetone. The creased films are then removed from the solvent, dried and repeatedly folded and unfolded at the crease line. The samples maintain integrity throughout these tests.

A film prepared by casting a solution of poly(2,2-diphenylpropane)carbonate of similar thickness is subjected to the same test as described above. The sample of the unmodified polycarbonate film shattered immediately at the point of stress when wet with acetone.

A 4–5 mil thick film prepared by solution casting a chloroform solution of polyarylene polyether is subjected to the same tests as indicated above. As in the case of the unmodified polycarbonate film, the phenylene ether film cracked when strained and immersed in the acetone solution.

EXAMPLE 15

A 1:1 powder blend of polyarylene polyether prepared as in Example 1 and poly(2,2-diphenylpropane)carbonate is prepared by mixing the powdered polymers in a Waring blendor. The powder blend is then compacted with pressure and fed into a melt viscometer. The blend is fused and repeatedly forced back and forth through an orifice over a 30 minute period while being held at a temperature of about 220° C. The final product is extruded to yield a tough, homogeneous product.

A portion of the powder blend is thermally fused and extruded as a rod from a melt indexer. The rod is then bent into a loop approximately one inch in diameter. When this loop is immersed in acetone, no apparent change is detected.

A similar experiment with an unmodified poly-(2,2-diphenylpropane)carbonate rod results in an almost explosive stress cracking.

EXAMPLE 16

In order to further demonstrate the improved properties exhibited by the polymeric mixtures prepared in accordance with the invention, chloroform solutions of polyarylene polyether prepared as in Example 1 and poly-(2,2-diphenylpropane)carbonate resin are prepared. The solutions are then blended to yield respectively 25:75, 50:50, and 75:25 polyarylene polyether-polycarbonate concentrations. Films are then cast from the solutions as well as the solutions containing the pure polyarylene polyether and pure polycarbonate. All of the films prepared from the polymer blends exhibit some whitening at stress points when immersed in acetone but none of these samples cracked. On the other hand, films prepared from the unmodified polyarylene polyether and the unmodified polycarbonate shatter immediately at the point of stress when wet with acetone.

The tensile heat distortion temperatures of the films thus prepared are measured at 264 p.s.i. using ASTM D648. The results obtained, shown in the table below are found to be totally unexpected since the addition of small quantities of the polyarylene polyether to the polycarbonate has a significantly greater effect on the heat distortion temperature than would be expected based on an arithmetic average.

TABLE I

| Parts polycarbonate | Parts polyarylene polyether | Heat distortion, ° C. at 264 p.s.i. of test sample | Temperature expected |
|---|---|---|---|
| 0 | 100 | 217 | 217 |
| 25 | 75 | 211 | 200 |
| 50 | 50 | 204 | 183 |
| 75 | 25 | 181 | 166 |
| 100 | 0 | 150 | 150 |

By virtue of the present invention, there are provided a new class of polymeric mixtures having improved resistance to thermal stress embrittlement and to environmental stress crazing and cracking. Such mixtures can be used in molding powder formulations either alone or in combination with fillers, such as, for example, wood flour, diatomaceous earth, silica and carbon black, to make molded parts of various shapes. They are useful in preparing gaskets, tubing and other materials which have an improved resistance to crazing and cracking when in contact with organic cleansing solvents or lubricants such as acetone, heptane or carbon tetrachloride, and are especially useful in molding load bearing parts to be exposed to elevated temperatures in use. The addition of small proportions of polyarylene polyethers to polycarbonates results in relatively large increases in the heat distortion temperature of the blend. From a practical standpoint, this allows the use of polycarbonates in applications where their general properties are particularly well suited and at the same time permit occasional operation at high temperatures where the polycarbonate resins alone would normally fail by heat distortion.

Films of the improved polymeric mixtures of the invention are useful as wrapping or packaging materials, as metal or fiber liners, containers, covers, closures, electrical insulating tapes, sound recording tapes, and pipe coverings.

Because of their improved craze resistant and thermal stress embrittlement properties, the polymeric mixtures of the present invention may be used as surface coverings for appliances, or as coatings for rods and wire, as slot insulation in dynamo electric machines and as bonding materials for parts for laminates as well as in adhesive formulations. They are also efficacious as wire enamels and may be readily admixed with pigments, stabilizers, and plasticizers. The compositions of the invention may also be admixed with other resinous materials.

I claim:

1. Polymeric mixture characterized by improved resistance to thermal stress embrittlement and improved resistance to environmental stress cracking comprising from about 1 to about 99 parts by weight of an aromatic polycarbonate polymer and from about 1 to about 99 parts by weight of a linear thermoplastic polyarylene polyether composed of recurring units having the formula

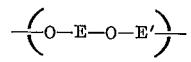

wherein E is the residuum of a dihydric phenol and E' is the residuum of a benzenoid compound having an inert electron withdrawing group having a sigma* value above about 0.7 in at least one of the positions ortho and para to the valence bonds, and where both of said residua are valently bonded to the ether oxygens through aromatic carbon atoms.

2. Mixture defined in claim 1 wherein said polyarylene polyether is composed of recurring units having the formula

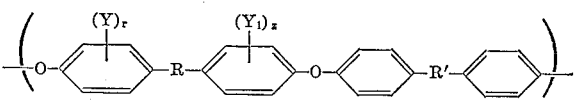

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene group and Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive.

3. Mixture defined in claim 1 wherein said polyarylene polyether is composed of recurring units having the formula

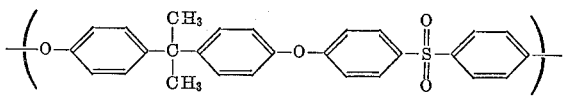

4. Mixture defined in claim 1 wherein said polyarylene polyether is composed of recurring units having the formula

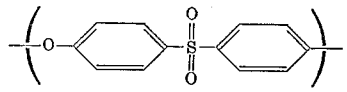

5. Polymeric mixture characterized by improved resistance to thermal stress embrittlement and improved resistance to environmental stress cracking comprising from about 1 to about 99 parts by weight of an aromatic polycarbonate polymer composed of recurring units having the formula

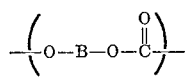

wherein B is a divalent aromatic radical and from about 1 to about 99 parts by weight, of a linear thermoplastic polyarylene polyether composed of recurring units having the formula

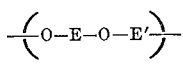

wherein E is the residuum of a dihydric phenol and E' is the residuum of a benzenoid compound having an inert electron withdrawing group having a sigma* value above about 0.7 in at least one of the positions ortho and para to the valence bonds, and where both of said residua are valently bonded to the ether oxygens through aromatic carbon atoms.

6. Mixture defined in claim 5 wherein said polyarylene polyether is composed of recurring units having the formula

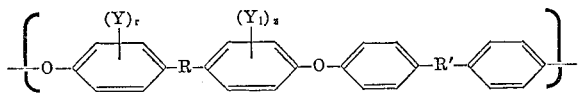

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive.

7. Mixture defined in claim 5 wherein said polyarylene polyether is composed of recurring units having the formula

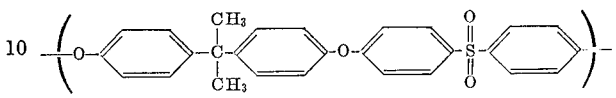

8. Mixture defined in claim 5 wherein said polyarylene polyether is composed of recurring units having the formula

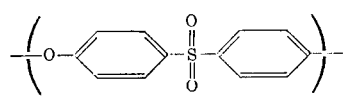

References Cited

UNITED STATES PATENTS 3,221,080  11/1965  Fox _____ 260—860

FOREIGN PATENTS 1,365,639  3/1964  France.
64/08,130  1/1965  Netherlands.

MURRAY TILLMAN, *Primary Examiner.*

J. T. GOOLKASIAN, *Assistant Examiner.*